United States Patent [19]

Burigana

[11] Patent Number: 5,479,964
[45] Date of Patent: Jan. 2, 1996

[54] ROTARY DOBBY HAVING CONNECTING ROD AUTOMATICALLY DISENGAGABLE FROM DRIVE SHAFT

[76] Inventor: Lucio Burigana, Via Tornielli, 15 - 33080 Roveredo in Plano (Pordenone), Italy

[21] Appl. No.: 169,646

[22] Filed: Dec. 20, 1993

[30] Foreign Application Priority Data

Dec. 18, 1992 [IT] Italy .................. UD92A0183

[51] Int. Cl.$^6$ .................................................. D03C 1/00
[52] U.S. Cl. .................................. 139/76; 139/455
[58] Field of Search ...................... 139/76, 455, 66; 74/563

[56] References Cited

U.S. PATENT DOCUMENTS

| | | | |
|---|---|---|---|
| 4,625,767 | 12/1986 | Schwarz | 139/76 |
| 4,730,641 | 3/1988 | Schwarz | 139/76 |
| 4,858,655 | 8/1989 | Palau et al. | 139/76 |
| 5,259,419 | 11/1993 | Vinciguerra et al. | 139/76 |

FOREIGN PATENT DOCUMENTS

3609859 9/1987 Germany .................. 139/76

*Primary Examiner*—Andy Falik
*Attorney, Agent, or Firm*—Wenderoth, Lind & Ponack

[57] ABSTRACT

A rotary dobby has two mutually opposed ratchet levers pivotably mounted to a cam disk engaging a connecting rod. First ends of the ratchet levers are to interact with two respective mating surfaces defined on the periphery of a drive disk integrated with a drive shaft. A rocking lever is pivotably mounted to the cam disk at a fulcrum that lies in a plane coincident with the axis of the drive shaft and extending between the pivots of the ratchet levers. The rocking lever has first and second terminal contact appendages disposed symmetrically with respect to the plane passing through the fulcrum and the axis of the drive. These appendages are operatively associated with second ends of the ratchet levers remote from the first ends thereof. The rocking lever also has a control arm positioned on the opposite side of the fulcrum from the terminal contact appendages and interacting with a control mechanism.

9 Claims, 5 Drawing Sheets

ROTARY DOBBY HAVING CONNECTING ROD AUTOMATICALLY DISENGAGABLE FROM DRIVE SHAFT

BACKGROUND OF THE INVENTION

1. Field of the Invention

The present invention relates to a rotary dobby used in the art of textile manufacture, and in particular, a rotary dobby of a power weaving loom.

Rotary dobbies provide a means of transmitting movement to the heald frames of a loom, through a rigid linkage, according to a programmed sequence implemented by an electronic device.

2. Description of the Related Art

A variety of prior art dobbies are known in which movement is selectively transmitted to a connecting rod, and hence to the heald frame which is connected to the rod by a linkage.

Certain of these dobbies utilize a key for this purpose. The key is slidably mounted to a cam disk and is received in a socket having a substantially rectangular section shape defined by either the drive shaft or by a drive disk rigidly fixed to the shaft.

This type of coupling constitutes a bilateral locking arrangement, resulting in the creation of a single body between the drive shaft and the cam disk which produces the oscillating movement of the rod.

Other types of dobbies make use of one or more rocking levers mounted to the cam disk, which similarly couple to a complementary socket in either the drive shaft or a drive disk rigidly fixed to the shaft.

All of these prior art dobbies possess one notable limitation, namely the need to suspend the rotation of the drive shaft for some duration.

In effect, a pause in the rotation of the drive shaft is necessary to allow the coupling elements, be they sliding keys or levers, to engage with and disengage from the sockets of the drive shaft or drive disk.

Further, various mechanisms are employed for effecting the engagement of the coupling elements with the drive shaft or disk disk.

These mechanisms range from the more traditional mechanical linkages which, through the use of cams, are actuated by electromagnetic devices in the form of powerful solenoids.

In any event, all of these mechanisms are complex and therefore costly to put into practice.

Similarly, the indexing system by which the drive shaft is made to pause following each rotation of 180°, normally consists of a plurality of mechanical elements.

Such elements are generally paired cams, rockers, gears and sectors which must be precision-engineered to guarantee satisfactory levels of performance in operation, and are therefore typified by high costs.

Moreover, the intermittent rotation of the drive shaft, i.e. of the pauses occurring after each half-revolution, result in subsequent high accelerations of the heald frame, which are hardly desirable at the high operating speeds required in particular by jet looms.

Accordingly, and as persons skilled in the art will know, any increase in the frequency of the start-up movement of the heald frames must be accompanied by a reduction in the acceleration of the resulting movement.

Without such a reduction, the system will generate strong moments of inertia, of an order sufficient to weaken the structure of mechanical components and to occasionally cause significant breakages of the warp threads, jeopardizing the output of the loom.

Attempts have been made to overcome the problems associated with the intermittent motion of the drive shaft. These attempts involve releasing the cam disk temporarily from the drive shaft.

Devices featuring such a solution are designed to engage and disengage a cam disk, mounted rotatably in a bearing of the connecting rod operating the heald frame, with and from a drive shaft that rotates continuously.

Accordingly, such devices dispense with the indexing mechanism that would control the movement of an intermittently driven shaft, as well as reduce accelerations in the movement of the heald frames.

With respect to this latter point, those skilled in the art know that the only means of obtaining low acceleration in the movement of the heald frames are governed by kinematic laws of harmonic motion or similar principles.

In the case of a rotary dobby, such movements are obtainable only with the drive shaft rotating at a constant angular velocity.

With this type of solution, centralized selection mechanisms are also rendered unnecessary.

In effect, the movements of the elements serving to connect the cam disk with the drive shaft are induced automatically, simply exploiting the rotation of the main shaft itself.

To this end, the cam disk carries two oscillating levers functioning in the manner of a ratchet.

The two levers in question are arranged in such a way as to engage, in a totally symmetrical manner, two mating surfaces defined by the drive shaft or by a disk rigidly fixed to the drive shaft.

The mating surfaces extend virtually in a radial direction, and are substantially disposed diametrically opposite one another.

The position occupied by the ratchet levers can be advanced relative to that of the mating surfaces defined by the drive shaft.

Following the dead center positions, the levers and mating surfaces engage and the cam disk is caused to rotate.

In this way, for all intents and purposes, there is no need to interrupt the rotation of the drive shaft.

DE-A-2909131 discloses a rotary dobby in which the ratchet levers are operated by a control device that is not described in the documents.

US-A-4625767 and US-A-4730641 disclose rotary dobbies in which the ratchet levers are operated by a plurality of elements such as guides, paired cams, rocker arms and large, powerful solenoids consuming considerable amounts of energy, etc., which must be precision-engineered in order to ensure satisfactory levels of performance. These dobbies are thus expensive to manufacture and put into practice.

Moreover, the overall dimensions of these dobbies prevent them from being capable of being retrofitted to conventional types of power looms in which the space available to accommodate such devices is especially limited.

Also, the basic prior art dobbies comprise elements which cannot withstand any prolonged exposure to the notable stresses generated during the operation of the dobby. As a result, the loom must be stopped frequently to replace such elements, and productivity of the loom is therefore notably reduced.

SUMMARY OF THE INVENTION

A first object of the invention is to overcome the above-described problems associated with prior art dobbies.

More specifically, a first object of the present invention is to provide a rotary dobby having a mechanism for governing the movement of the cam-controlled connecting rods, which mechanism has a simple structure, is capable of withstanding stresses, and at the same time is inexpensive to put into practice.

Another object of the invention is to provide a rotary dobby that will improve the performance of the loom to which it is applied, especially in the case of a high speed jet loom.

A rotary dobby according to the present invention has a drive shaft that rotates at constant angular velocity and a cam disk that supports two ratchet levers biased by springs toward positions at which the levers will contact respective mating surfaces of a drive disk integrated with the drive shaft.

The ratchet levers can be manipulated to allow the cam disk to automatically engage with and disengage from the drive disk integrated with the drive shaft. The drive disk may be a discrete element rigidly fixed to the shaft by a coupling.

In this way, the movement of the heald frames in the loom can be made to follow a programmed sequence implemented by a suitable electronic monitoring and control device.

More specifically, the ratchet levers are operated by a rocking lever pivotably mounted to the cam disk. The cam disk is in turn rotatably mounted in a bearing of a connecting rod linked in conventional manner to the heald frames of the loom.

The pivot of the rocking lever lies in a plane passing through the axis of the drive shaft, and occupies a position equally distant from and lying beyond the fulcrums of the ratchet levers, in relation to the shaft.

In one embodiment, two restraint levers are disposed at symmetrical positions to the outside of the cam disk.

Each restraint lever is capable of oscillating between a first position of non-interference with the rocking lever and an operating position (right-hand and left-hand position, respectively) of interaction with the rocking lever.

Movement of a particular one of the restraint levers into its operating position will be determined by the direction of rotation of the drive shaft.

With the restraint levers occupying the position of non-interference, the cam disk is free to rotate as one with the drive shaft. On the other hand, when one of the restraint levers is in its operating position, the rocking lever is intercepted and actuates at least one of the ratchets levers to disengage from the drive disk. Thus, the cam disk will become motionless while the drive shaft continues to rotate (idle).

In one form of the invention only one ratchet lever is disengaged. Thus, as the drive shaft continues rotating, the remaining ratchet lever, still in contact with the periphery of the drive disk, will jump each time it encounters one of the mating surfaces.

The noise resulting from the jumping of the ratchet lever over the mating surfaces can be a source of annoyance. A second form of the present invention obviates this problem.

In this second form, the rocking lever is designed to unseat both the ratchet levers simultaneously from the drive disk.

This is made possible by the provision of two auxiliary levers, each operating in conjunction with a respective ratchet lever and actuated simultaneously by the rocking lever.

Further, a lever is pivotably mounted to the cam disk. The lever carries a wheel and is biased to press the wheel outwards against the bearing of the connecting rod. The bearing includes a detent in the form of two notches.

When the wheel is located in one of the notches, the cam disk will remain stably at a dead center position relative to the connecting rod.

The position of the cam disk when at standstill, and therefore with the heald frame raised or lowered, can be maintained for an indefinite period of time.

In effect, this state will be maintained until the restraint lever is returned to its position of non-interference with the rocking lever.

At this point the rocking lever is released, thus allowing the ratchet lever or levers to be reseated against the other circumference of the cam disk.

With the ratchet levers now reseated against the mating surfaces of the drive disk, the cam disk is once again locked to the drive disk and thus with the continuously rotating drive shaft.

BRIEF DESCRIPTION OF THE DRAWINGS

These and other objects, features and advantages of the present invention will be better understood from the following description of preferred embodiments thereof made with reference to accompanying drawings, of which:

FIG. 5b is a sectional view taken along line 5b—5b in FIG. 5a;

FIG. 5c is a sectional view taken along line 5d—5d in FIG. 5a; and

DESCRIPTION OF THE PREFERRED EMBODIMENTS

Referring to the accompanying sheets of drawings, reference numeral 25 denotes a rotary dobby according to the present invention.

Figure 1:
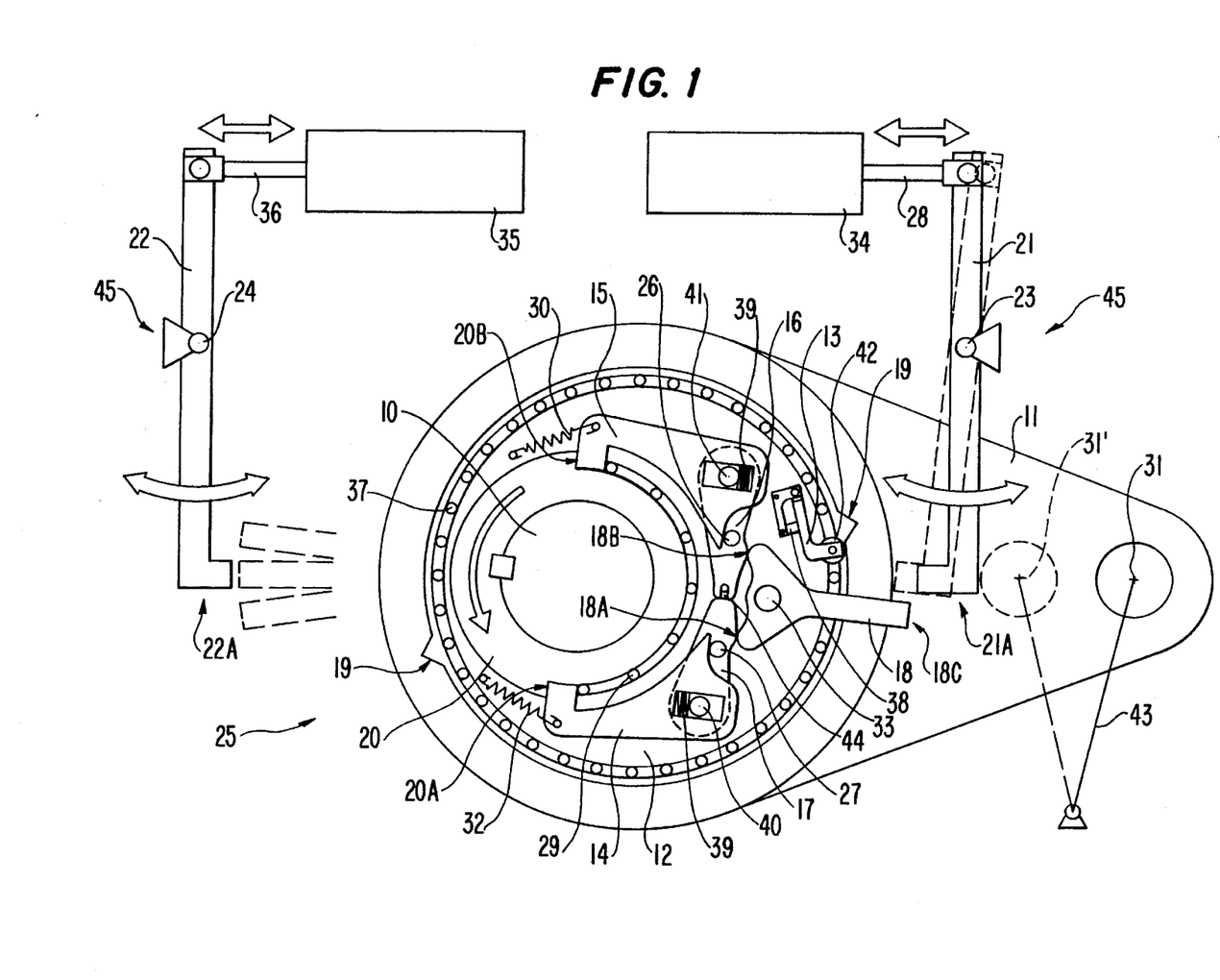
FIG. 1 is a schematic diagram of a first embodiment of a rotary dobby according to the present invention.
Figure 2:
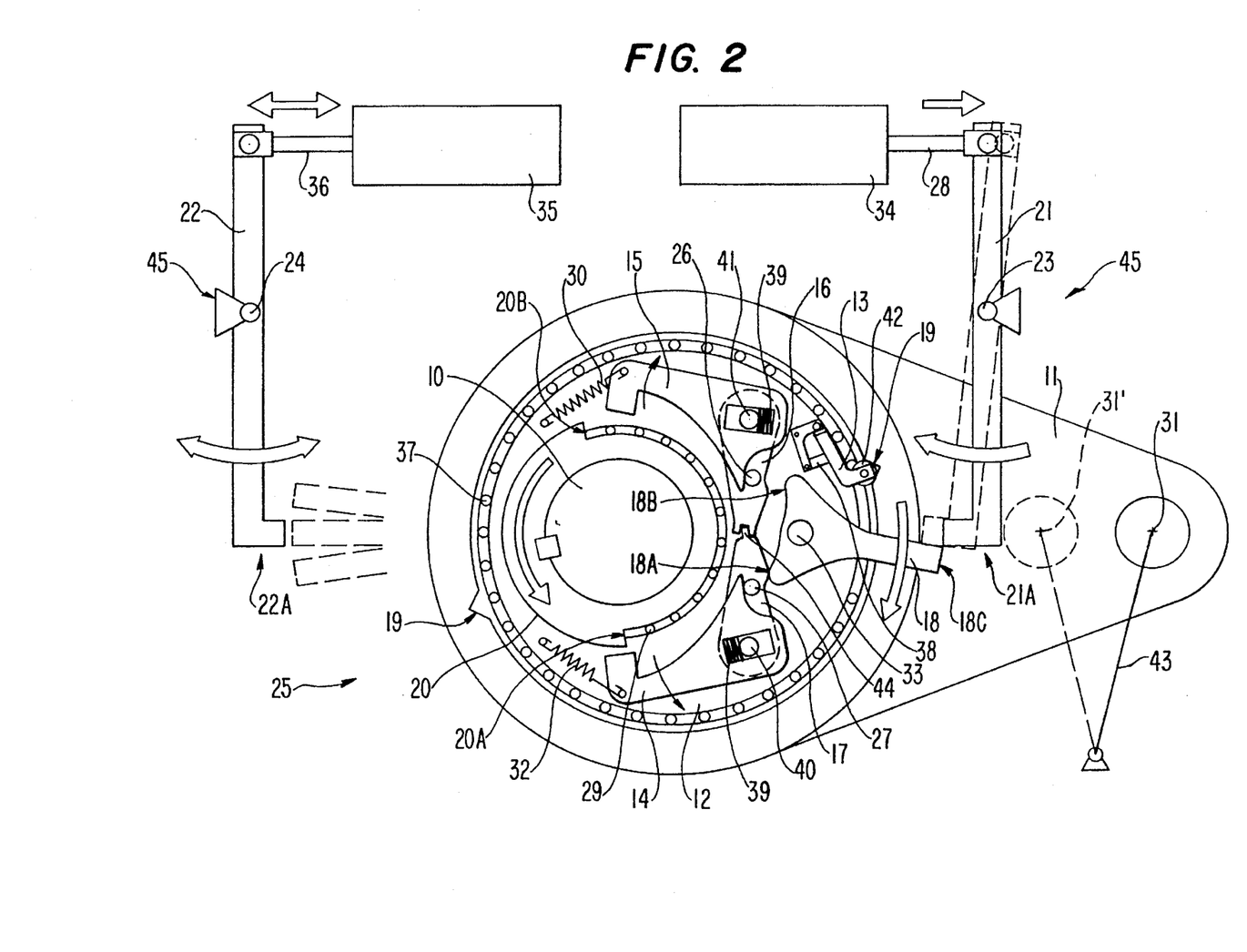
FIG. 2 is a similar view but shows the ratchet levers of the dobby in a released state, the cam disk of the dobby at a standstill, and the drive shaft of the dobby in an idling state.
Figure 3:
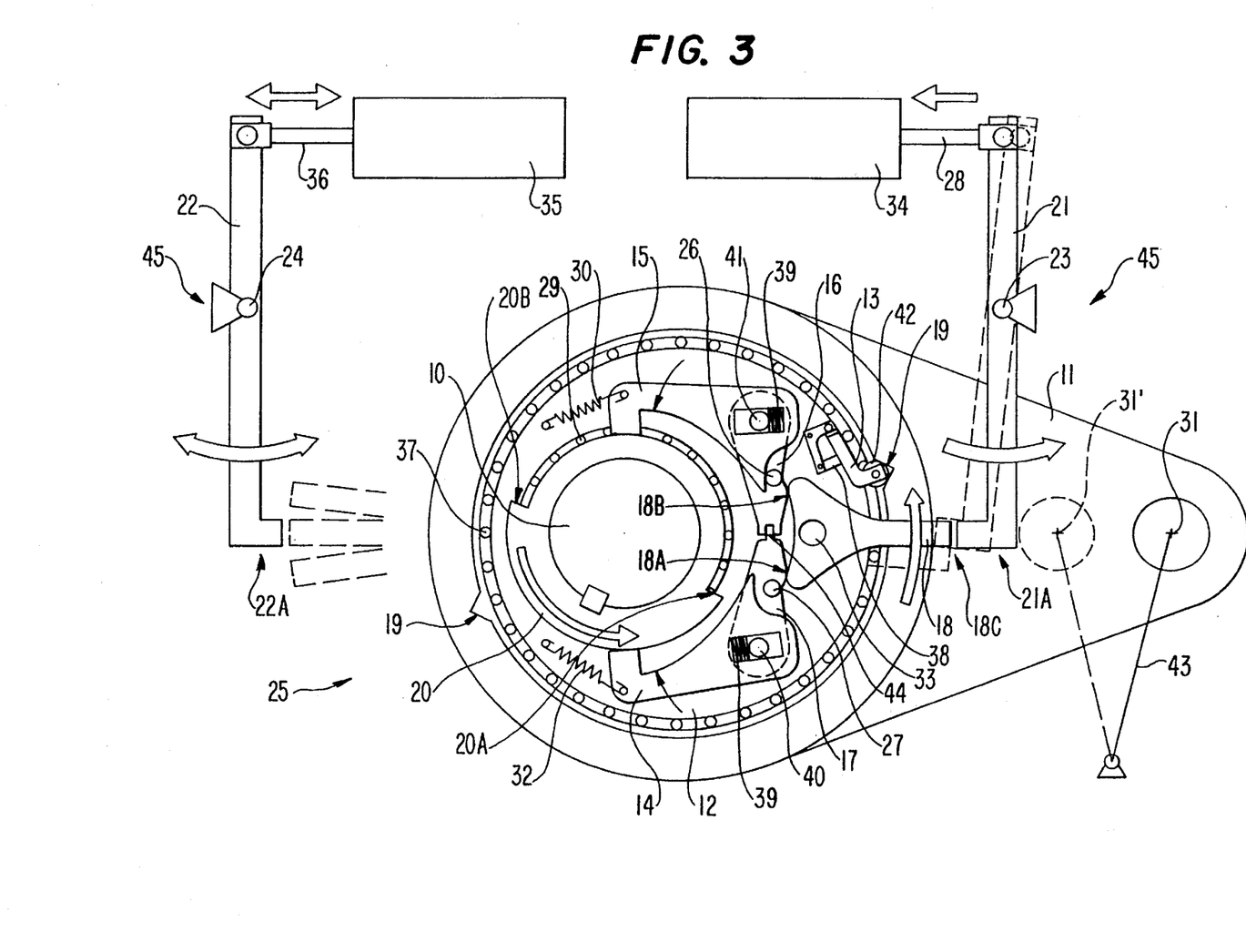
FIG. 3 is a view also similar to FIG. 1 and shows the cam disk at a standstill, but about to be set in rotation.

FIGS. 1, 2 and 3 illustrate a first embodiment of the invention, in which a cam-driven connecting rod 11 of the rotary dobby 25 operates in conjunction with a drive shaft 10 rotating at a constant angular velocity.

A drive disk 20 is keyed to the drive shaft 10. The drive disk 20 has outer circumferential surfaces of dissimilar diameter, one larger and one smaller. These outer surfaces are connected by two mating surfaces 20A and 20B extending in a substantially radial direction.

The profile of such first and second mating surfaces 20A and 20B may be rectilinear, crowned, or concave, according to design considerations.

In the illustrated embodiment, the first and second mating surfaces 20A and 20B are offset from a line coincident with the diameter of the disk by a distance equivalent to half the width of each tooth provided at the corresponding ends of first and second ratchet levers 14 and 15, respectively.

A cam disk 12 is rotatably mounted to the drive disk 20 by rolling bearing elements such as balls or rollers 29.

The connecting rod 11 in turn is mounted to the periphery of the cam disk 12 by further rolling elements such as balls or rollers 37.

The head of the rod 11 rotatably connected to a lever 43 of a mechanical linkage (not illustrated in the drawings) by a pivot 31.

Accordingly, successive half-revolutions of the cam disk 12 will move the lever 43 between a first position, indicated by the continuous line in FIGS. 1 to 3, and a second position 31' indicated by phantom lines.

First and second ratchet levers 14 and 15 are pivotably mounted to first and second pivots, 40 and 41, respectively, supported by the cam disk 12.

The dobby also comprises two auxiliary levers 17 and 16 respectively mounted to the same first and second pivots 40 and 41.

The first and second auxiliary levers 17 and 16 are connected by meshing teeth 44 so as to rotate in opposite directions about pivots 40 and 41, respectively.

Each auxiliary lever 17 and 16 carries a fixed pin 27 or 26 positioned to interact with the first 14 and the second 15 ratchet lever, respectively.

Also, a rocking lever 18 is rotatably mounted to the cam disk 12 by a pivot 33.

The rocking lever 18 affords two terminal contact appendages 18A and 18B at one end thereof. These appendages interact with corresponding surfaces of the first and second auxiliary levers 17 and 16. The other end of the lever forms a control arm 18C extending beyond the cam disk 12.

Under certain operating conditions, as described more fully in due course, the control arm 18C of the rocking lever 18 interacts for a given period with control means denoted by reference numeral 45.

In the illustrated embodiments, the control means 45 includes one or two restraint levers 21 and 22 each having a respective terminal portion 21A and 22A.

An oscillating lever 13 is also mounted to the cam disk 12. One end of the lever 13 carries a wheel 42 and the lever 13 is tensioned by a compression spring 38 such that the wheel 42 remains in rolling contact with the circumferential bearing surface of the connecting rod 11.

The wheel 42, thus subjected to the force of the compression spring 38, will become located in one of two V-shaped detent notches 19 defined in the circumferential bearing surface of the rod 11.

Solenoid means, in the form of two solenoids 34 and 35 are spaced from the connecting rod 11, and preferably disposed thereabove. These solenoids may be bistable or monostable.

According to the preferred embodiment, the solenoids 34 and 35 will be of low rated power, and hence will exhibit minimal energy consumption and dimensions, in view of the modest force each is required to produce.

Piloted by an electronic pattern monitoring and control device of conventional components (not shown in the drawings), the solenoids 34, 35 serve to govern the selection of the movement transmitted to the cam disk 12, and therefore to the heald frame associated with the disk.

The moving cores 28 and 36 of the solenoids 34 and 35 are connected to the respective restraint levers 21 and 22, which oscillate about corresponding pivots 23 and 24.

The aforementioned terminal portions 21A and 22A of the restraint levers 21 and 22 are located at the ends of the levers remote from the solenoid cores 28 and 36, and are embodied as catches.

Figure 5A:
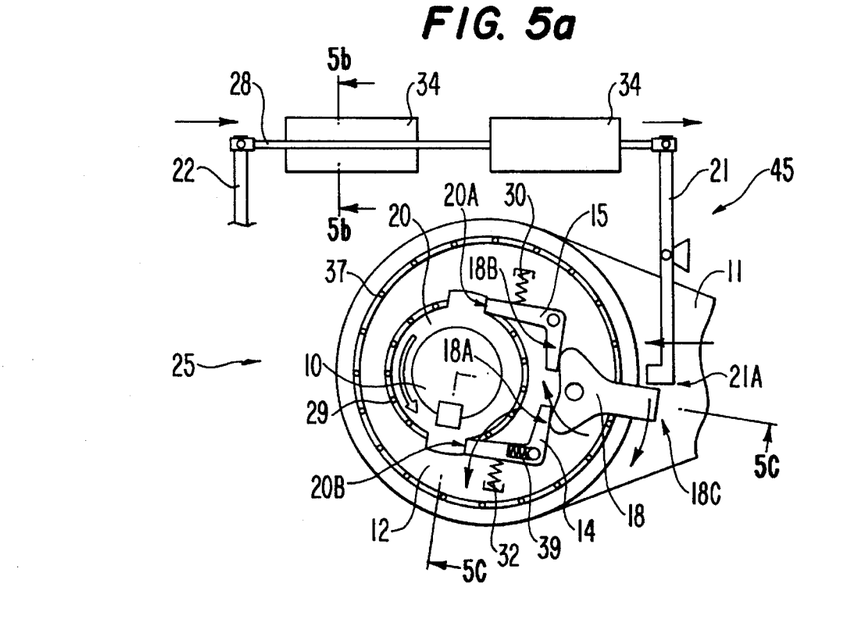
FIG. 5a is a schematic view of still another embodiment of the dobby according to the present invention, in which one ratchet lever only is released at a time.
Figure 5B:
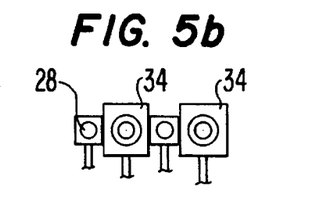
Figure 5C:
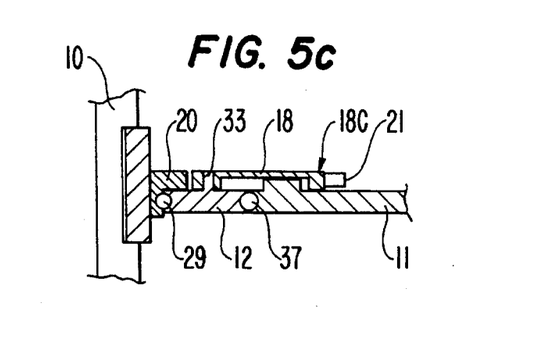

In the embodiment of FIG. 5a–5c, the solenoid means consists of just one bistable, double-acting solenoid 34 having a single core 28 to which both of the restraint levers 21 and 22 are attached.

When an electrical signal is supplied to the solenoid 34 of the rotary dobby 25 of FIGS. 5a–5c, the core 28 shifts and the two restraint levers 21 and 22 are rotated simultaneously about their respective pivots 23 and 24.

The embodiment of FIG. 5a–5c has a simpler overall structure than that of the embodiment of FIGS. 1–4, given that the number of solenoids is reduced by half. Further, more space is made available for the solenoid means since only one solenoid 34 is utilized.

The operation of the invention will now be described.

With reference to FIG. 1, in particular, the first and second ratchet levers 14 and 15 are shown as engaged with the respective mating surfaces 20A and 20B of the drive disk 20.

More specifically, the two ratchet levers 14 and 15 are biased into engagement by return springs 32 and 30.

In this situation, the cam disk 12 is forced to rotate as one with the drive disk 20 and thus induce oscillate the lever 43 of the mechanical linkage, and hence the pivot 31 associated with the rod 11, between a first position indicated by the continuous line and a second position 31' shown in phantom.

As a result, the heald frame connected to the rod 11 by the mechanical linkage will raise and lower the warp threads.

The oscillating movement continues until such time as an electrical signal is applied to either of the solenoids 34 or 35.

The timing of the electrical signal in question is determined by a weave program loaded into and run by the electronic monitoring and control device of the rotary dobby 25.

FIG. 2 shows the situation in which the signal has been applied to the solenoid 34. As a result, the core 28 shifts and causes the first restraint lever 21 to rock about its pivot 23.

The terminal portion 21A (catch) thus intercepts the control arm 18C of the rocking lever 18 during the course of its revolution with the cam disk 12.

With the control arm 18C and the terminal catch portion 21A now interlocked, the rocking lever 18 is prevented from rotating with the disk and is forced to rock about its pivot 33.

However, because the disk drive 20 is locked to the drive shaft 10 and continues to rotate at a constant angular velocity, the cam disk 12 likewise continues to be rotated. As a result, the rocking lever 18 is forced to turn clockwise about its pivot 33 as indicated by the arrow in FIG. 2.

Consequently, the first contact appendage 18A is pressed against the first auxiliary lever 17, which rocks about the corresponding first pivot 40.

The movement thus induced in the first auxiliary lever 17 is transmitted by the meshing teeth 44 to the second auxiliary lever 16, which duly undergoes a coordinated rotation.

More specifically, the auxiliary levers rotate toward the drive shaft 10 with the effect, due to the pins 27 and 26, that the first and second ratchet levers 14 and 15 are spread apart.

Thus, the first and second ratchet levers 14 and 15 are unseated from the respective first and second mating surfaces 20A and 20B of the drive disk 20, at the same time overcoming the forces exerted by the return spring 32 and 30.

With the detent lever 13 biased outwardly by the compression spring 38, the wheel 42 is forced into the V-shaped notch 19, thereby locking the cam disk 12 in a relative dead center position and positioning the corresponding heald frame.

Thus, the first and second ratchet levers 14 and 15 are fully spread apart on the one hand, while on the other, the cam disk 12 is locked stably in the dead center position.

As the cam disk 12 is brought to a standstill, its kinetic energy is transmitted to the elastic system composed of the return springs 30 and 32 and the compression spring 38.

If a signal is applied to the other solenoid 35, the same operation will be triggered by way of the corresponding restraint lever 22.

Lastly, the same operation occurs if the direction of rotation of the drive shaft 10 is reversed, for example during weft detection, thanks to the perfect symmetry of the dobby according to the invention.

In this instance, when the appropriate signal is applied to the solenoid 34 or 35, the restraint lever 21 or 22 of the control means 45 will meet the rocking lever in the second operating position.

With the cam disk 12 and the corresponding heald frame are thus rendered motionless, the drive shaft 10 and the drive disk 20 rigidly connected thereto are free to idle indefinitely.

This situation will persist until a signal is generated by the electronic weave pattern monitoring and control device to reposition the heald frame, in which case the cam disk 12 must again be coupled to the drive shaft 20 by the first and second ratchet levers 14 and 15.

In FIG. 3, which illustrates this step, the solenoid 34 has received an electrical signal operative to return the core 28 to its former position.

As a result, the first restraint lever 21 is rotated about pivot 23 in the direction of the arrow, releasing the control arm 18C of the rocking lever 18 from the terminal portion 21A (catch).

The rocking lever 13 is thus free to rotate. Accordingly, the rocking lever 18 is rotated counterclockwise by the force exerted by the return spring 30 and transmitted to the lever 18 via the second ratchet lever 15, pin 26 and auxiliary lever 16. The lever 18 thus again extends in the radial direction of the cam disk 12.

Further, the second ratchet lever 15 is brought to bear against the circumferential surface of the lesser diameter of the drive disk 20.

Similarly, the first ratchet lever 14 is brought into contact with the circumferential surface of the greater diameter of the drive disk 20 by the force exerted by the return spring 32.

Normally speaking, the timing of this particular step is advanced in relation to the moment at which a first and second mating surface 20A and 20B is brought into contact with the corresponding tooth of the respective first and second ratchet levers 14 and 15.

It will be observed, for example, in FIG. 3 that the tooth of the second ratchet lever 15, after having been brought into engagement with the drive disk 20, is about to be reseated on the mating surface 20A.

It is clear, therefore, that the first mating surface 20A and the tooth of the second ratchet lever 15 must necessarily meet with a certain impact resulting from their relative velocity.

To reduce the negative effect of such an impact, the dobby further comprises two damper springs 39 interposed respectively between the first and second ratchet levers 14 and 15 and the corresponding first and second pivots 40 and 41.

The moment that contact is brought about between the first mating surface 20A and the second ratchet lever 15, the first ratchet lever 14, tensioned by return spring 32, will be brought to bear against the drive disk 20 and into contact with the second mating surface 20B.

In this way, the drive disk 20 and the cam disk 12 are united by a dual locking action.

Accordingly, the cam disk 12 begins once again to rotate together with the drive disk 20, and movement is transmitted to the associated heald frame in the state shown in FIG. 1.

Figure 6:
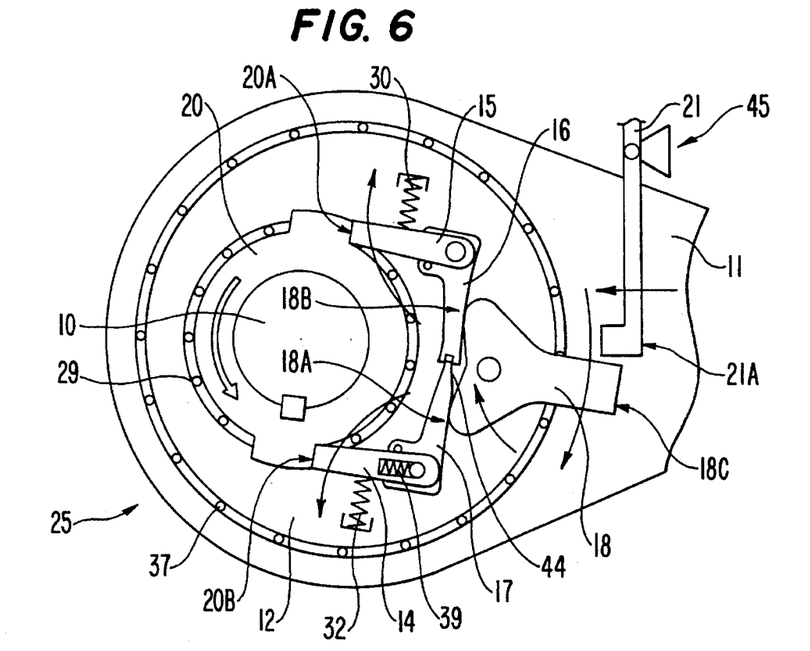
FIG. 6 is a fragmentary view of still another embodiment of the dobby according to the present invention.

FIG. 6 illustrates another embodiment of the rotary dobby according to the present invention.

FIGS. 4 and 5a–5c show other embodiments which differ from the embodiment of FIGS. 1–3 primarily with respect to the first and second ratchet levers 14 and 15 which serve to connect and disconnect the drive disk 20 and the cam disk 12.

Figure 4:
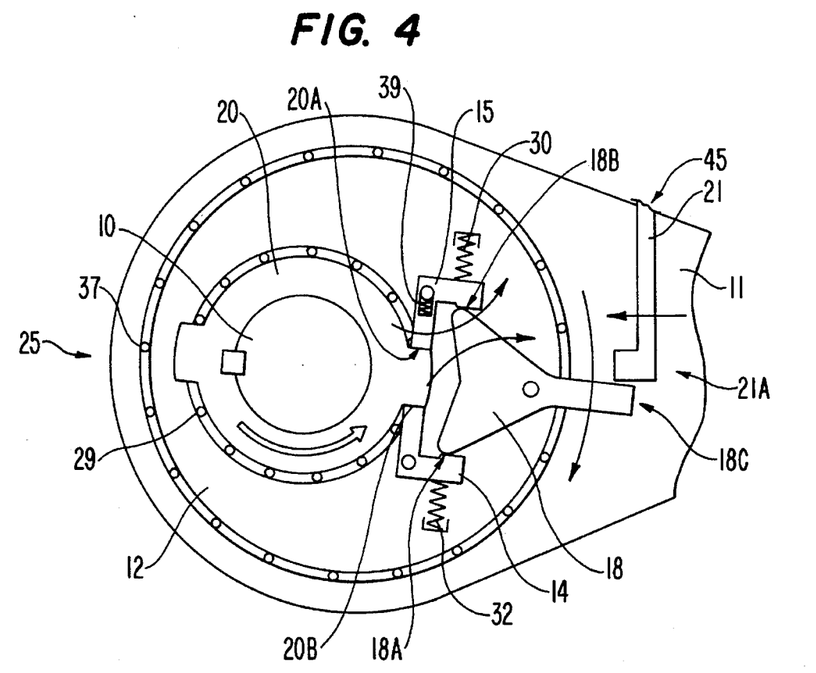
FIG. 4 is a fragmentary view of another embodiment of the dobby according to the present invention, in which one ratchet lever only is released at a time.

More specifically, the embodiments of FIGS. 4 and 5 utilize substantially the same type of rocking lever 18. However, in this case, the lever 18 will release only one ratchet lever, 14 or 15 directly.

That is, the auxiliary levers 16 and 17 are no longer utilized, and the first and second ratchet levers 14 and 15 are essentially L-shaped.

In these embodiment, furthermore, the meshing teeth 44 are eliminated and the first and second ratchet levers 14 and 15 remain independent of one another, operating one at a time.

When the drive shaft 20 rotates counterclockwise and the first restraint lever 21 is the lever in operation, the control arm 18C of the rocking lever 18 will interact with the terminal portion 21A of the lever 21.

As a result, in the embodiment of FIG. 4, the rocking lever 18 will rotate clockwise about pivot 33 and thereby cause the second ratchet lever 15 to swing outwardly, releasing the cam disk 12 from the drive disk 20.

In the embodiment of FIGS. 5a–5c, the rocking lever 18 will also rotate clockwise about pivot 33, though in this instance unseating the first ratchet lever 14 to release the cam disk 12 from the disk drive 20.

The embodiments of FIGS. 4 and 5 also exhibit the symmetry described above in connection with the first embodiment, so that the direction of rotation of the drive shaft 10 can be reversed to facilitate weft detection, for example.

I claim:

1. A rotary dobby comprising:

a connecting rod;

a cam disk in camming engagement with said connecting rod, said cam disk having an outer periphery defining two respective mating surfaces;

a drive shaft;

a drive disk integral with said drive shaft so as to rotate therewith;

two mutually opposing ratchet levers pivotably mounted to said cam disk at respective fulcrums, each of said ratchet levers having a first end engageable with a respective one of said mating surfaces defined by the outer periphery of said cam disk, and a second end remote from the first end;

a rocking lever pivotably mounted to said cam disk at a pivot, said pivot lying in a plane coincident with the axis of said drive shaft, said plane passing between the respective fulcrums at which the ratchet levers are pivotably mounted to said cam disk, respectively, while extending from said pivot to the axis of said drive shaft, said rocking lever having a first end disposed to one side of said pivot as viewed in a direction parallel to said plane, and a second end disposed to the other side of said pivot as viewed in said direction, said first end of the rocking lever comprising first and second terminal contact appendages disposed symmetrically with respect to said plane and respectively operatively connected to the second ends of said ratchet levers so as to cause said ratchet levers to pivot about said fulcrums, and said second end of said rocking lever constituting a control arm; and control means for cooperating with the control arm of said rocking lever to control the rocking of said rocking lever about said pivot.

2. A rotary dobby as in claim 1, wherein said control means includes at least one restraint lever movable between a position of non-interference with said control arm and an operating position which will intercept said control arm of the rocking lever during the course of rotation of said cam disk.

3. A rotary dobby as in claim 1, wherein said control means comprises at least one solenoid.

4. A rotary dobby as in claim 2, wherein said control means comprises a pair of restraint levers each designated for movement to the operating position thereof based on the direction of rotation of said cam disk.

5. A rotary dobby as in claim 1, and further comprising interlocking auxiliary levers operatively connecting the terminal contact appendages of the rocking lever with the ratchet levers, respectively.

6. A rotary dobby as in claim 5, wherein the auxiliary levers having meshing gear teeth that interlock the auxiliary levers.

7. A rotary dobby as in claim 1, and further comprising mutual alignment means for selectively aligning the connecting rod and the cam disk in a predetermined position relative to one another.

8. A rotary dobby as in claim 7, wherein said mutual alignment means comprises a wheel, a lever carrying said wheel and pivotably mounted to the cam disk, a spring cooperating with said lever to bias the wheel in a direction extending away from the axis of the drive shaft, and a detent comprising at least one notch in a circumferential bearing surface of the rod that is in camming engagement with said cam disk.

9. A rotary dobby as in claim 1, and further comprising damper springs associated with the ratchet levers to dampen the force of impact between the first ends of said ratchet levers and said mating surfaces.

* * * * *